(12) United States Patent
Copeland et al.

(10) Patent No.: US 7,870,564 B2
(45) Date of Patent: Jan. 11, 2011

(54) OBJECT-BASED COMPUTER SYSTEM MANAGEMENT

(75) Inventors: Bruce W. Copeland, Redmond, WA (US); David C. James, Bothell, WA (US); Donald Y. Song, Redmond, WA (US); Dustin M. Ingalls, Sammamish, WA (US); Jeffrey A. Sutherland, Seattle, WA (US); Jeffry B. Phillips, Seattle, WA (US); Joseph S. Calabig, Sammamish, WA (US); Khuzaima Iqbal, Redmond, WA (US); Michael J. Healy, Redmond, WA (US); Rajagopalan Badri Narayanan, Redmond, WA (US); Zhengkai Kenneth Pan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1241 days.

(21) Appl. No.: 11/355,506

(22) Filed: Feb. 16, 2006

(65) Prior Publication Data

US 2007/0192453 A1 Aug. 16, 2007

(51) Int. Cl.
*G06F 13/00* (2006.01)
(52) U.S. Cl. .................. 719/316; 719/310; 719/313; 719/315; 709/223
(58) Field of Classification Search .............. 719/310, 719/313–320; 707/1, 3, 10; 709/223–226
See application file for complete search history.

(56) References Cited

U.S. PATENT DOCUMENTS

| | | | |
|---|---|---|---|
| 6,317,748 B1 | 11/2001 | Menzies et al. | |
| 6,466,932 B1 * | 10/2002 | Dennis et al. | ............ 707/3 |
| 6,493,719 B1 | 12/2002 | Booth et al. | |
| 6,892,245 B1 | 5/2005 | Crump et al. | |
| 6,970,923 B1 | 11/2005 | Mukaiyama et al. | |

(Continued)

FOREIGN PATENT DOCUMENTS

EP 0 750 254 12/1996

(Continued)

OTHER PUBLICATIONS

Wies, Rene, Policies in Network and Systems Management—Formal Definition and Architecture, Jounal of Network and Systems Management, Plenum Publishing Corp., vol. 2, No. 1, Mar. 1994.

(Continued)

*Primary Examiner*—Hyung S Sough
*Assistant Examiner*—Kimberly Jordan
(74) *Attorney, Agent, or Firm*—Perkins Coie LLP

(57) ABSTRACT

A method, system, and architecture for managing computer systems is provided. A management system employs management objects (MOs) to provide administrators the ability to intuitively express the administrative intent in an information technology (IT) environment, and to act out the administrative intent based on the information gathered by the management system. Managed elements of an IT environment, such as, by way of example, hardware components, software applications, software updates, software distribution policies, configurations, settings, etc., may be expressed as MOs. Actions, such as, by way of example, detect, install/apply, remove, remediate, enumerate, etc., may be associated with the MOs. The management system manages the computer systems by deploying the appropriate MOs and their associated actions onto the computer systems, and performing the actions on the computer systems.

20 Claims, 8 Drawing Sheets

U.S. PATENT DOCUMENTS

| | | |
|---|---|---|
| 7,555,749 B2 * | 6/2009 | Wickham et al. ........... 717/168 |
| 2002/0042847 A1 | 4/2002 | Takats et al. |
| 2002/0103890 A1 | 8/2002 | Chaudhuri et al. |
| 2003/0061334 A1 | 3/2003 | Hirata et al. |
| 2003/0135665 A1 | 7/2003 | Barker et al. |
| 2004/0236760 A1 | 11/2004 | Arkeketa et al. |
| 2005/0027377 A1 | 2/2005 | Lucas et al. |
| 2005/0086337 A1 | 4/2005 | Quittek et al. |
| 2005/0262076 A1 * | 11/2005 | Voskuil ......................... 707/8 |
| 2006/0025985 A1 | 2/2006 | Vinberg et al. |
| 2007/0005320 A1 | 1/2007 | Vinberg et al. |

FOREIGN PATENT DOCUMENTS

EP  0 784 259  7/1997

OTHER PUBLICATIONS

Fullford, Eborah et al., A Federation Tool: Using the ManaGement Object Model (MOM) to Manage, Monitor and Control an HLA Federation, 1999.

* cited by examiner

Management Object

Composite Management Object

| Unique ID | Property 1 | Property 2 | ... | Property n |
|---|---|---|---|---|
| ... | ... | ... | ... | ... |

Management Object Specific Configuration Table

FIG. 4

OBJECT-BASED COMPUTER SYSTEM MANAGEMENT

BACKGROUND

It is not uncommon for an organization to have hundreds, if not thousands of computer systems, such as personal computers, work stations, servers, clients, etc. As organizations become increasingly dependent on the proper operation of their computer systems, the proper administration of these computer systems is becoming ever more important.

The day-to-day administration of the computer systems in an organization is a complex task and presents a major challenge. For example, certain applications, such as MICROSOFT's Exchanger Server application, which play an integral part in the operations of the organization, need to be properly executing and available at all times. These applications are typically configured to be executing with a large list of settings and configurations. A slight deviation from one of the parameters—i.e., settings and/or configurations—can cause expensive downtimes. Moreover, the human cost associated with keeping these applications properly executing within the desired settings and configurations, and determining when and/or if there is a change to the settings and/or configurations in a timely manner, is very expensive.

Organizations typically assign the task of administering the proper performance of the computer systems, including the applications to a team of information technology professionals generally known as system administrators. System administrators strive to ensure the proper operation of the computer systems and the applications provide proper and consistent service to their users.

To assist in the performance of their tasks, system administrators typically utilize one or more system management tools. Current system management tools are able to gather information regarding the managed computer systems. For example, system administrators can use the system management tools to gain knowledge of "what" is on the computer systems. However, current system management tools do not allow system administrators to express the administrative intent. Stated differently, while current system management tools allow system administrators to know "what is out there" (e.g., know what computer systems are in the organization; know what applications are executing; know how the applications are configured; etc.), current system management do not allow system administrators to make the computer systems in the organization "what they ought to be." Moreover, current system management tools are deficient in allowing system administrators to perform actions based on the information gathered by the system management tools.

SUMMARY

A method, system, and architecture for managing computer systems is provided. A management system employs management objects (MOs) to provide administrators the ability to intuitively express the administrative intent in an information technology (IT) environment, and to act out the administrative intent based on the information gathered by the management system. Managed elements, such as, by way of example, hardware components, software applications, software updates, software distribution policies, configurations, settings, etc., of an IT environment may be expressed as MOs. Actions, such as, by way of example, detect, install/apply, remove, remediate, enumerate, etc., may be associated with the MOs. The management system manages the computer systems by deploying the appropriate MOs and their associated actions onto the computer systems, and performing the actions on the computer systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a block diagram that illustrates an example management object-specific configuration table, according to some embodiments.

DETAILED DESCRIPTION

Figure 1:
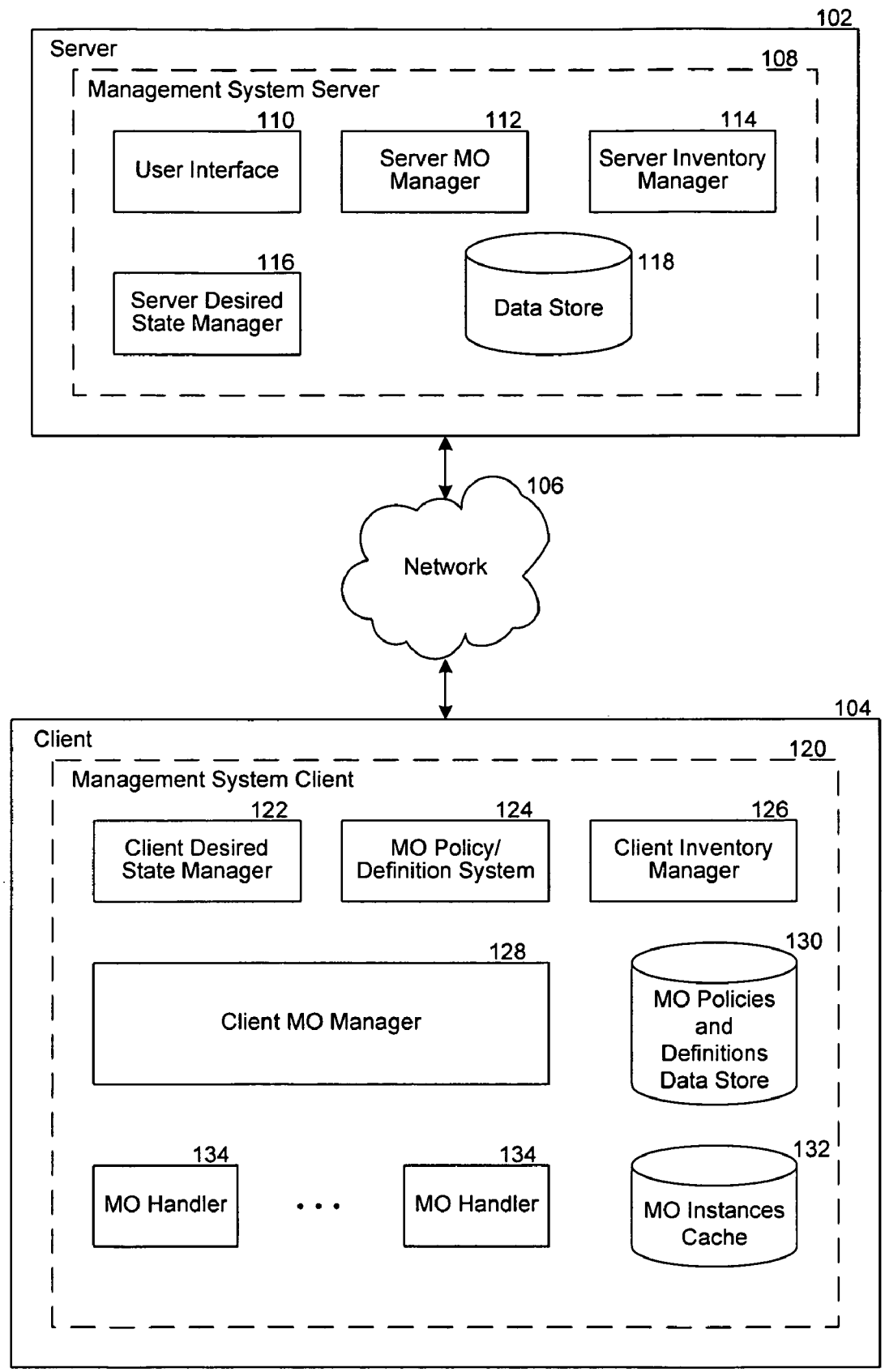
FIG. 1 is a high-level block diagram illustrating an architecture of a management system, according to some embodiments.

A method, system, and architecture for the management of computer systems (also referred to herein as "machines") using objects is provided. In various embodiments, the management system employs management objects (MOs) to provide users, such as administrators, the ability to intuitively express the administrative intent in an information technology (IT) environment, and to act out the administrative intent based on the information gathered by the management system. A MO is the unifying concept to manage elements in an IT environment. All managed elements, such as, by way of example, hardware components, software applications, software updates, software distribution policies, configurations, settings, etc., in an IT environment may be expressed as MOs. The definition of an MO defines the type of component (or element), and a physical representation of that MO in the managed environment is its instance.

In some embodiments, MOs may be the atomic representation of inventory in the IT environment. By way of example, assuming that a managed computer may have a central processing unit (CPU) and memory, an administrator may have used the management system and previously created a MO definition for a CPU and a MO definition for memory. Using these MO definitions, the management system may express a 1 GHz Intel CPU as an instance of the CPU MO, and may express a 512 Mb DDR random access memory (RAM) made by Micron as an instance of the memory MO. Here, the MO becomes a unit of inventory. The CPU and memory components that make up the managed computer are MO definitions, while individual instances of these components in the managed environment comprises inventory.

MOs may also be the atomic representation of change in the IT environment. The IT environment may be constantly changing. For example, a configuration parameter for an application, such as a MICROSOFT Exchange server, when changed, may unexpectedly cause "downtime." By creating an MO definition to represent the configuration, an administrator can use the management system to monitor that Exchange server parameter, can cause a change to its value, and can cause an action to be invoked if an undesired change to the parameter is detected.

In some embodiments, MOs may contain the concept of relationships. An MO may be independent by itself and not depend on any other MOs in the IT environment. Conversely, an MO may inherit from a previously created MO. The inheriting MO may extend or may modify its existing or inherited definition. For example, a software application may be represented in the IT environment as a MO. A patched version of this software application can then be represented by a new MO that inherits from the previously created MO for the non-patched software application. The relationship concept allows an administrator the ability to treat complex entities as one manageable unit or component. For example, using derivation, composition, and bundling concepts to express different relationships in and amongst MOs, the administrator can build a MO that represents a complex entity from MOs of other components. A composite MO (also referred to herein as a "container MO") may be considered a "tight composition" if it is not possible for the composite MO to exist when any one of the components from which the composite MO is built from is not present. Conversely, a composite MO may be considered a "loose composition" if it is possible for the composite MO to exist even when the components from which the composite MO is built from are not present. An example would be a connection between an OUTLOOK client and its Exchange server, whereby the composition may or may not exist if the connection is dropped. If the composition exists even if the connection is dropped, then the composition is a loose composition. Otherwise, the composition is a tight composition. Examples of a tight composition are aggregated objects. For example, a computer is made up of a CPU, memory, cache etc. These parts can exist without the whole (i.e., computer), but the whole cannot exist without its parts. The management system may provide conflict-detection capabilities that resolve conflicts in evaluating the MO relationships.

In some embodiments, each MO has associated with it the concept of a global identity to uniquely distinguish the MO in a managed environment, or among environments. MOs may be exchanged through importing and exporting. For example, importing is the process by which published MOs can enter the system and then be deployed in the managed environment. A managed environment is comprised of a set of MOs defined in a particular organization (e.g., an enterprise's corporate network). Exporting is the process by which anyone who has created an MO can create a representation that can be shared/published to other systems. In some embodiments, the MOs may also be officially authored through the concept of digital signing. In some embodiments, the MOs may be made available through a web community or portal, for example, where authors can officially publish and exchange MO definitions.

One or more actions, such as, by way of example, detect, install/apply, remove, remediate, enumerate, etc., may be associated with the MOs. The MOs contain or support logic that is used to perform a specified action for the MO. For example, an MO contains detection logic which can be used to determine whether MO is present on a managed node (e.g., a managed computer or machine). Similarly, an MO may also support other execution logic, such as install/apply, remove, and remediate methods, which can be used to get an instance of the MO installed, removed, or fixed on a managed node. For composite MOs, the action associated with the composite or container MO is the aggregation of all of the contained MOs. Thus, an apply action on the container MO is equivalent to executing all of the apply methods of the contained MOs. Enumeration is based on the concept that the majority of MO instances that exist on a managed node can be discovered. For example, MICROSOFT Installer Package (MSI) applications can be a source of MO instances—i.e., the application instances may have been installed using MSI. For these applications, by making calls to MSI, it is possible to enumerate and create MO instances for all applications already installed. This is regardless of whether or not the management system installed the application on the managed node. In some embodiments, the associated action may be specified as part of the MO definition. In some embodiments, the associated actions may be specified in a corresponding policy.

In some embodiments, the MOs may be intelligently targeted via applicability rules. Using applicability rules, an administrator can limit or specify the targeting of MOs. For example, a MO can be made to only apply to certain managed machines that fit or meet certain rules or conditions. Applicability rules may specify, by way of example, hardware requirements regarding the managed machine on which the MO is to be applied (e.g., a minimum processor speed, a minimum amount of memory, a minimum amount of free hard disk space, a minimum amount of available network bandwidth, particular security mechanisms available, etc.), software requirements regarding the managed machine on which the MO is to be applied (e.g., a particular operating system (OS) that should already be installed on the managed machine, one or more other applications that should already be installed on the managed machine, specifications regarding how particular hardware and/or the OS is to be configured on the managed machine, such as particular settings for the OS, a particular type of security or encryption that should be in use, etc.), other requirements regarding the managed machine on which the MO is to be applied (e.g., particular security keys that should be available, data center policies that should be enforced, authentication that is used, system topology, membership to a collection of machines, value of a registry setting, etc.), and so on. The applicability rules may also be specified using MOs. For example, the aforementioned hardware requirements, software requirements, and other requirements may each be specified as a MO, and the applicability rules may be created using these MOs. In some embodiments, the applicability rules may be specified in a policy.

The applicability rules may specify positive constraints or requirements specifying that something should be present on the managed machine (e.g., the processor on the managed machine should have at least a minimum processor speed, a particular OS should already be installed on the managed machine, etc.). The applicability rules may also specify negative constraints or requirements specifying that something should not be present on the managed machine (e.g., one or more particular applications should not already be installed on the managed machine, particular OS settings should not be present on the managed machine, a firewall should not be active on the managed machine, etc.).

In some embodiments, the management system provides an interface through which an administrator, or other knowledgeable user, can compose MOs to create a desired state of a machine or machines, and monitor and remediate the machines thereafter. The desired state can be expressed as MOs being "required" to be present on the machine or machines, or "not allowed" to be present on the machine or machines. The administrator can use the management system to deliver some or all of the MOs to each of the machines. A client process of the management system (e.g., a management system agent), which is executing on each of the managed machines, can then monitor and enforce the desired state, as expressed by the MOs that were delivered onto each of the machines, on each of the managed machines. In some embodiments, if the management system detects a derivation from the desired state as expressed by the MOs, the management system can generate a suitable alert of the event. In some embodiments, the management system may initiate a remediate action to place the machine or machines to the desired state. The management system client process can also periodically monitor and/or enforce the desired state on each of the managed machines.

By way of an example scenario, an administrator may determine that each of the managed machines is to be configured with MICROSOFT Word, MICROSOFT Exchange client, and a baseline set of security patches. The administrator can use the management system, which may be executing on a server, to compose a MO for each of the elements of the standard desktop configuration (i.e., MICROSOFT Word, MICROSOFT Exchange client, and a baseline set of security patches), as well as compose a MO that expresses the standard desktop configuration. The administrator can also specify that the management system is to perform a detect action on the standard desktop configuration MO to obtain an inventory of the managed machines that are compliant with the standard desktop configuration. For example, the administrator may specify the detect action in a policy that is downloaded onto each of the managed machines. The management system can then deploy the standard desktop configuration MO to a management system client process running on each of the managed machines to run an inventory of the managed machines in order to determine how many of the managed machines are not configured as desired (i.e., with the standard desktop configuration). The management system client process running on each of the managed machines, seeing that the standard desktop configuration MO is composed of several other MOs, subsequently performs a detect action on each of the MOs that comprise the standard desktop configuration MO, to perform the detect action on the standard desktop configuration MO. The management system client process on each of the managed machines passes the results of the detect action to the management system running on the server. The management system on the server can then create and provide a report of the inventory of the managed machines. The administrator can review the inventory report and use the management system running on the server to deploy the standard desktop configuration MO and have it applied to each of the managed machines according to a schedule as specified by the administrator. The administrator can also request the management system to provide an alert if any of the managed machines become non-compliant with the standard desktop configuration. In response, the management system client process on each managed machine may periodically perform a detect action on the standard desktop configuration MO, and report an error condition if the managed machine becomes non-compliant (e.g., any one of the MOs comprising the standard desktop configuration MO is not detected on the managed machine). The administrator can also request the management system to automatically remediate non-compliant managed machines. Here, once a required MO, for example, the baseline security patch MO, is not detected on a managed machine, the management system can perform an apply action on the required MO that is not detected on the managed machine to make the non-compliant managed machine compliant.

FIG. 1 is a high-level block diagram illustrating an architecture of a management system, according to some embodiments. As depicted, a server computing system 102 is coupled to a client computing system 104 via a network 106. The server computing system hosts a management system server 108 comprising a user interface 110, a server MO manager 112, a server inventory manager 114, a server desired state manager 116, and a data store 118. The client computing system hosts a management system client 120 comprising a client desired state manager 122, a MO policy/definition system 124, a client inventory manager 126, a client MO manager 128, a MO policies and definitions data store 130, a MO instances cache 132, and a plurality of MO handlers 134. As depicted in FIG. 1, the management system architecture is shown comprising a server component (the management system server) and a client component (the management system client). The management system client is an agent or entity that provides an interface to a machine that needs to be managed. Only one server computing system is shown in FIG. 1 for simplicity, and one skilled in the art will appreciate that the management system server may be distributed over a multiple number of server computing systems. The management system client executes on each managed machine. One skilled in the art will also appreciate that the management system server and the management system client may execute on the same computer system.

The user interface allows access into the features and functions provided by the management server. The user interface may be implemented as one or more interface pages that allow an administrator, or other suitable user, the ability to interact with the management system. For example, using the interface pages, the administrator can author MO definitions, assign a MO definition or multiple MO definitions to a machine or a collection of machines, specify applicability rules and actions, specify a specific action for a MO definition, specify a schedule or schedules, author MO policies, request reports, and perform other tasks. Different interface pages may be provided depending on the type of MO and/or the task that is being performed. For example, an interface page that allows the administrator to create a MO definition may display different information and/or fields depending on the type of MO that is being defined. In some embodiments, the user interface is implemented as part of a management system administrator console that is accessible by credential users, such as the administrator. In a typical scenario, the administrator may use a communication portal running on a computer system to remotely access the user interface, for example, over the Internet.

The server MO manager deploys the MO definitions to the managed machines. For example, the server MO manager can take the MO definitions from the data store and appropriately deploy the MO definitions by making sure the MO definitions get to the managed machines. This may involve securely and efficiently getting the MO definitions across one or more networks. In some embodiments, the MO manager may also deploy additional information, such as, by way of example, various MO policies, to the managed machines. In some embodiments, the server MO manager evaluates MO relationships, and resolves detected conflicts between MOs (e.g., conflicts may arise in MO inheritance and MO composition). In some embodiments, the MO definitions and other information are deployed to the managed machines using a "pull" architecture, where the server MO manager informs the managed machines of the need to download one or more MO definitions and/or other information, and the managed machines go to the server computing system, or other appropriate server, to request and download the appropriate MO definitions and/or information.

In some embodiments, the managed machines only request and download the changed and/or new MO definitions and/or other information (e.g., MO policies) since the last time this information was pulled. Pulling only the changed and/or new MO definitions and/or other information conserves enterprise bandwidth and avoids unnecessary downloading of information. For example, the MO manager may maintain a record of the MO definitions and other information which were deployed on each of the managed machines. When a managed machine subsequently requests the appropriate MO definitions, rather than downloading all of the MO definitions that are appropriate for the managed machine, the MO manager is able to determine the MO definitions that are new or which have changed since the last time this information was downloaded, and only download the changed and/or new MO definitions to the managed machine.

The server inventory manager deploys the MO definitions and inventory settings (e.g., MO inventory policies) to the managed machines. For example, an administrator may use the user interface to request an inventory of MO instances through either the detect action or the enumerate action. The administrator may also specify a schedule as to when the inventory is to be taken and when the inventory results are to be provided. This information may be formulated into one or more MO inventory policies and stored in the data store. The server inventory manager can take the MO definitions and MO inventory policies from the data store and appropriately deploy the MO definitions and MO inventory policies onto the managed machines. The server inventory manager receives the results of the requested inventory from the managed machines. For example, the server inventory manager may receive an inventory report for all specified MOs from each managed machine that was requested to perform an inventory. The server inventory manager may then store the reports in the data store for use in subsequent reporting.

The server desired state manager deploys the MO definitions and the state definitions (e.g., MO compliance policies) to the managed machines. For example, an administrator may use the user interface to describe a desired state (i.e., state definition) of one or more managed machines. The administrator can use MOs to define, for example, the presence of one security update as a state of compliance. The administrator may specify this through the detect action (e.g., detecting an instance of the security update MO on a managed machine means that the managed machine is in compliance). The administrator may aggregate multiple MO definitions to express the overall compliance in one container MO. For example, a "secured desktop" container MO definition can be composed of several mandatory software update MOs. This state definition may be formulated into one or more MO compliance policies and stored in the data store. The server desired state manager can take the MO definitions and MO compliance policies from the data store and appropriately deploy the MO definitions and MO compliance policies onto the managed machines. The server desired state manager may receive alerts indicating compliance or non-compliance from each managed machine that was requested to perform a compliance check. The server inventory manager may then store the alert reports in the data store for use in subsequent reporting.

The MO policy/definition system periodically pulls the MO definitions and/or various MO polices from the server MO manager. The MO policy/definition system may persist and cache the received MO definitions and MO polices in the MO policies and definitions data store. The MO policy/definition system may trigger itself in a scheduled manner to execute the actions associated with the MOs by, for example, invoking the client MO manager. The MO policy/definition system detects and refreshes the MO definitions that may have changed and, thus, are no longer valid. In some embodiments, the MO policy/definition system pulls only the changed (e.g., new) MO definitions and MO policies.

The client MO manager executes (i.e., acts out) the administrative intent, as specified by the MOs and the MO policies, on the managed machine. In some embodiments, the client MO manager may be triggered by the MO policy/definition system whenever there is something to process (e.g., a new MO definition or MO policy is received and cached on the managed machine). The client MO manager can retrieve the cached MO definitions, recursively evaluate any inheritance and composition relationships, and invoke an appropriate MO handler to execute the desired action associated with, the MO. For example, the MO manager evaluates the inheritance and composition relations of a composite MO by recursively executing the specified action for the MOs, including any other composite MOs, which make up the composite MO. In some embodiments, the client MO manager asks the MO handlers whether the MO handler knows how to perform the desired action for the MO. The client MO manager may query each of the MO handlers in a predetermined sequence, until a MO handler that can perform the desired action for the MO is found. One skilled in the art will appreciate that the client MO manager can use other techniques to identify a MO handler that can perform the desired action for the MO. For example, the client MO manager, or a registry, can be informed of the types of MOs a MO handler supports when the MO handler registers with the management system client. The client MO manager or the registry can be informed of the information/data that is needed by the MO handler to execute the desired action or actions for the MO. As another example, the client MO manager can query a registry to determine a MO handler that is appropriate to execute a desired action for the MO. In this manner, the client MO manager need not contain any knowledge regarding the type of MO (e.g., whether the MO defines a hardware setting, a software application, a MSI application, etc.), and the client MO manager can support different types of MO handlers. Moreover, the MO handlers may be dynamically configured or otherwise included in the management system client.

Depending on the MO handler that is to execute the desired action, the client MO manager may only pass a unique identifier that uniquely identifies the MO definition and an indication of the desired action to perform to the MO handler. For example, an MSI MO handler may be knowledgeable regarding the MSI installed applications on the managed machine, and given a MO identifier, the MSI MO handler can determine whether an instance of the MO that is identified by the received MO identifier (i.e., the application) is detected on the managed machine. The MSI MO handler, or other MO handler that contains knowledge or intelligence (e.g., logic) to detect a MO instance without the unique identifier of the MO, can also perform an enumeration action to enumerate the unique identifiers corresponding to the MO instances detected on the managed machine. For example, when requested, the MSI MO handler can enumerate the unique identifiers for the MO instances corresponding to instances of the MSI applications detected on the managed machine. For other types of MO handlers that require additional information to execute the specified action, the client MO manager may pass additional information, such as the MO definition and/or other information regarding the object defined by the MO definition (i.e., a MO package), which is needed by the MO handler to perform the desired action.

In some embodiments, the client MO manager applies the applicability rules that are associated with the MOs. The client MO manager may also evaluate MO relationships, and resolves detected conflicts between MOs (e.g., conflicts may arise in MO inheritance and MO composition). In some embodiments, the client MO manager stores the results of the executed actions for the MOs in a cache, such as the MO instances cache. The client MO manager periodically checks the contents of the MO instances cache to determine whether the cached results of the actions are "stale" (e.g., aged beyond a predetermined amount of time). Upon determining that a cached result of an action is stale, the client MO manager can purge the cached result from the cache and execute the action again. Caching the action results in this manner preserves machine resources in that the same actions are not executed unnecessarily.

The MO handlers execute the actions for the MO definitions. For example, the client MO manager invokes a MO handler to execute an action (e.g., detect, enumerate, install/apply, remove, remediate, etc.) on a MO definition. MO handlers may contain varying levels of intelligence, and depending on the level of built-in intelligence, a MO handler receives varying amounts of information from the client MO manager when invoked to execute an action. For example, a generic software MO handler may require information regarding where to look on a managed machine, as well as how to detect an instance of an application on the managed machine. The generic software MO handler may also require information regarding how to remove an instance of an application that is detected on the managed machine. A hardware MO handler may need information regarding how to detect the presence of a hardware device on the managed machine. A machine settings MO handler may need information regarding the setting to detect (e.g., a software setting, a hardware setting, an application setting, an OS setting, etc.), how to detect the setting, how to apply the setting, etc. The information that a MO handler requires may be specified in a registry that is accessible by the client MO manager, or may be directly specified to the client MO manager. In contrast, other MO handlers, such as the aforementioned MSI MO handler, may contain the intelligence to perform an action or actions by receiving only the unique identifier of a MO or the unique identifier and an indication of the desired action.

The client inventory manager takes an inventory of the specified MOs on the managed machine, and sends the results of the inventory to the server inventory manager. In some embodiments, the client inventory manager takes an inventory of instances of the specified MOs from the MO instances cache by requesting the client MO manager to check the MO instances cache. The client MO manager determines whether an instance of a MO detected in the MO instance cache is fresh enough to be returned as inventory or if it needs to invoke the detect or enumerate action for the MO. The client inventory manager may trigger itself in a scheduled manner to periodically run an inventory of the specified MOs on the managed machine. The schedule may be specified in a policy, such as an MO inventory policy.

The client desired state manager takes the desired state information, and checks or queries for the instance of the desired state on the managed machine, and sends a compliance report or a non-compliance report to the server desired state manager. In some embodiments, the client desired state manager requests the client MO manager to check the MO instances cache for instances of the MOs that comprise the desired state. The presence or absence of a MO instance is used to determine compliance state. For example, if the state information specifies that a MO must be present on the managed machine, and an instance of the MO was found (detected), a compliance report is generated. If the state information specifies that a MO is not allowed on the managed machine, and an instance of the MO was found, the managed machine is deemed out-of-compliance, and a non-compliance report is generated. The client MO manager determines whether an instance of a MO detected in the MO instance cache is fresh enough to be used to determine compliance state or if it needs to invoke the detect or enumerate action for the MO. The client desired state manager may trigger itself in a scheduled manner to periodically run a compliance check of the desired state on the managed machine. The schedule may be specified in a policy, such as an MO compliance policy. In some embodiments, the client desired state manager can trigger a remediation action to place a non-compliant managed machine into compliance.

In general terms, the network is a communications link that facilitates the transfer of electronic content between, for example, the attached target machine, management server and content servers. In some embodiments, the network includes the Internet. It will be appreciated that the network may be comprised of one or more other types of networks, such as a local area network, a wide area network, a point-to-point dial-up connection, and the like.

The computing device on which the management system, including the management system server process and the management system client process, is implemented may include a central processing unit, memory, input devices (e.g., keyboard and pointing devices), output devices (e.g., display devices), and storage devices (e.g., disk drives). The memory and storage devices are computer-readable media that may contain instructions that implement the management system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the management system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The management system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
FIG. 2 is a block diagram that illustrates selected components of a management object, according to some embodiments.
Figure 2:
Figure 2:

FIG. 2 is a block diagram that illustrates selected components of a MO, according to some embodiments. As depicted, the MO comprises a unique identifier 202, a detection logic 204, and an optional execution logic 206. The unique identifier uniquely identifies the MO. In some embodiments, the unique identifier is globally unique and deterministic. The detection logic specifies a manner in which to detect the presence (i.e., an instance) of the MO on the managed machine. For example, the detection logic may specify a function call, a method call, a schema that declaratively describes the MO, a provider or other source that knows how to detect the MO, etc. The execution logic specifies a manner in which to install or apply the MO, for example, to create an instance of the MO on the managed machine. The MO may also specify how to remove (de-install) an instance of the MO.

Figure 3:
FIG. 3 is a block diagram that illustrates selected components of a composite management object, according to some embodiments.

FIG. 3 is a block diagram that illustrates selected components of a composite MO, according to some embodiments. As depicted, the composite MO is composed of a list of MOs 302. The list of MOs specify zero, one or more independent MOs and zero, one or more other composite MOs that make up the composite MO.

FIG. 4 is a block diagram that illustrates an example management object specific configuration table, according to some embodiments. The MO-specific configuration table contains records that further describe the MOs. As depicted, the MO-specific configuration table comprises MO configuration records 402, and each MO configuration record is shown comprising, by way of example, a unique ID field 404 and a plurality of property fields 406. The unique ID field contains the unique identifier of a MO definition. The property fields contain the properties that are associated with and that describe the object defined by the MO identified in the corresponding unique ID field. The properties specified in the property fields may be strongly-typed based on the particular types of MOs. Stated differently, the properties may be different based on the type of MO that is being described. For example, for a MO that defines an application, the properties might include the product name, the version and/or release of the application, the service pack, and the like. For a MO that describes a hardware component, such as a CPU, the properties might include the processor speed, the manufacturer, the model, the cache, the bus architecture, etc. In some embodiments, multiple MO-specific configuration tables may be provided. For example, a MO-specific configuration table may be provided for the different types of MOs.

In some embodiments, the MO-specific configuration table is maintained on the server computing system, for example, in the data store. In some embodiments, the information/data contained in the MO-specific configuration table may be made available to the managed machines as required. For example, various components of the management system client, such as the MO policy/definition system or the client MO manager, may download information/data that additionally describes a MO and which is maintained in the MO-specific configuration table, and provide this information to a MO handler to enable the MO handler to execute an action for the MO.

Figure 5:
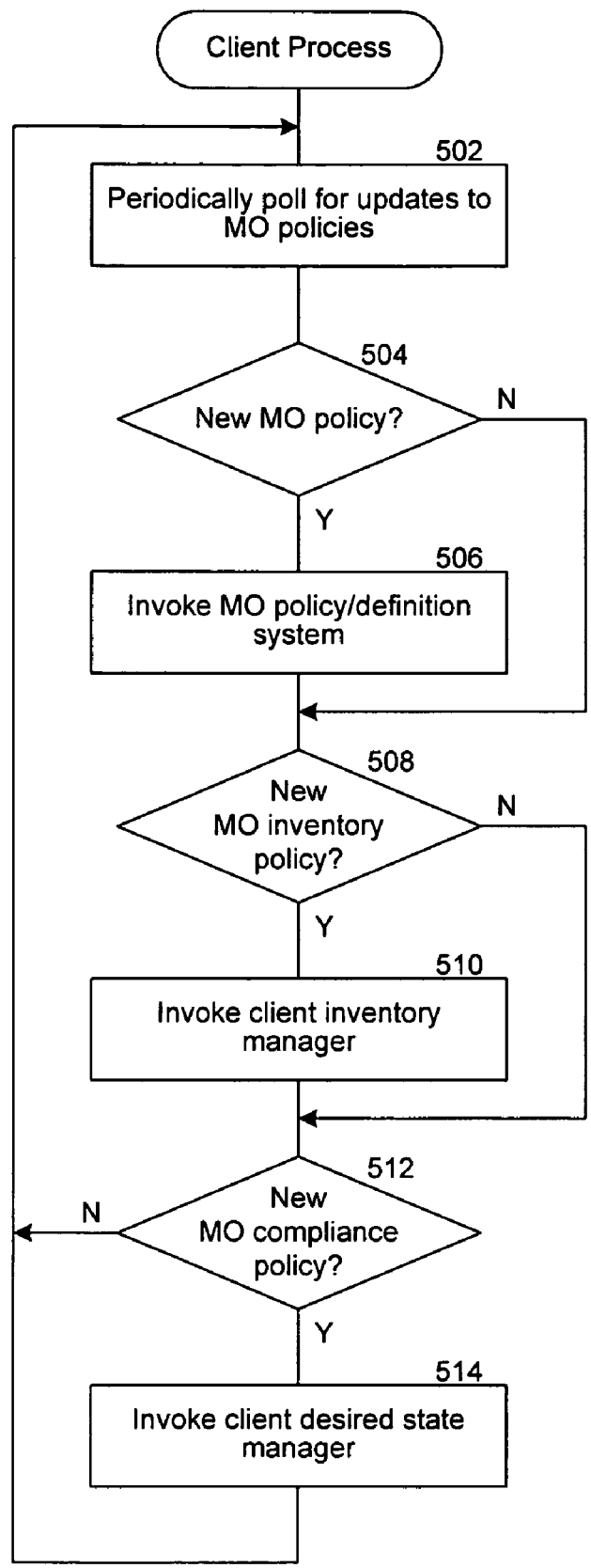
FIG. 5 is a flow diagram that illustrates the processing of a management system client process, according to some embodiments.

FIG. 5 is a flow diagram that illustrates the processing of a management system client process, according to some embodiments. By way of example, an administrator, using the management system server user interface, may have created one or more MOs, including any MO relationships, applicability rules and action (e.g., MO policies), and schedules, and assigned the MOs to a machine or collection of machines to express the administrator's desired intent for the managed machines. In block 502, the management system client process executing on each of the managed machines periodically polls for updates to MO policies. For example, the management system client process can periodically poll the management system server, or other suitable server, such as a distribution server, for new policies. In some embodiments, the management system client process executing on each of the managed machines periodically polls for updates to MOs (i.e., MO definitions). In block 504, the management system client process checks to determine whether there is a new MO policy to pull. If there is a new MO policy to pull, the management system client process, in block 506, invokes the MO policy/definition system. In embodiments where the management system client process also periodically polls for updates to MOs, the management system client process also invokes the MO policy/definition system when there is a new MO to pull.

Otherwise, if the management system client process determined that there are no new MO policies to pull (block 504), or subsequent to invoking the MO policy/definition system (block 506), the management system client process, in block 508, checks to determine whether there is a new MO inventory policy to pull. If there is a new MO inventory policy to pull, the management system client process, in block 510, invokes the client inventory manager. Otherwise, if the management system client process determined that there are no new MO inventory policies to pull (block 508), or subsequent to invoking the client inventory manager (block 510), the management system client process, in block 512, checks to determine whether there is a new MO compliance policy to pull. If there is a new MO compliance policy to pull, the management system client process, in block 514, invokes the client desired state manager. Otherwise, if the management system client process determined that there are no new MO compliance policies to pull (block 512), or subsequent to invoking the client desired state manager (block 514), the management system client process returns to block 502 and periodically polls for updates to MO policies.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 6:
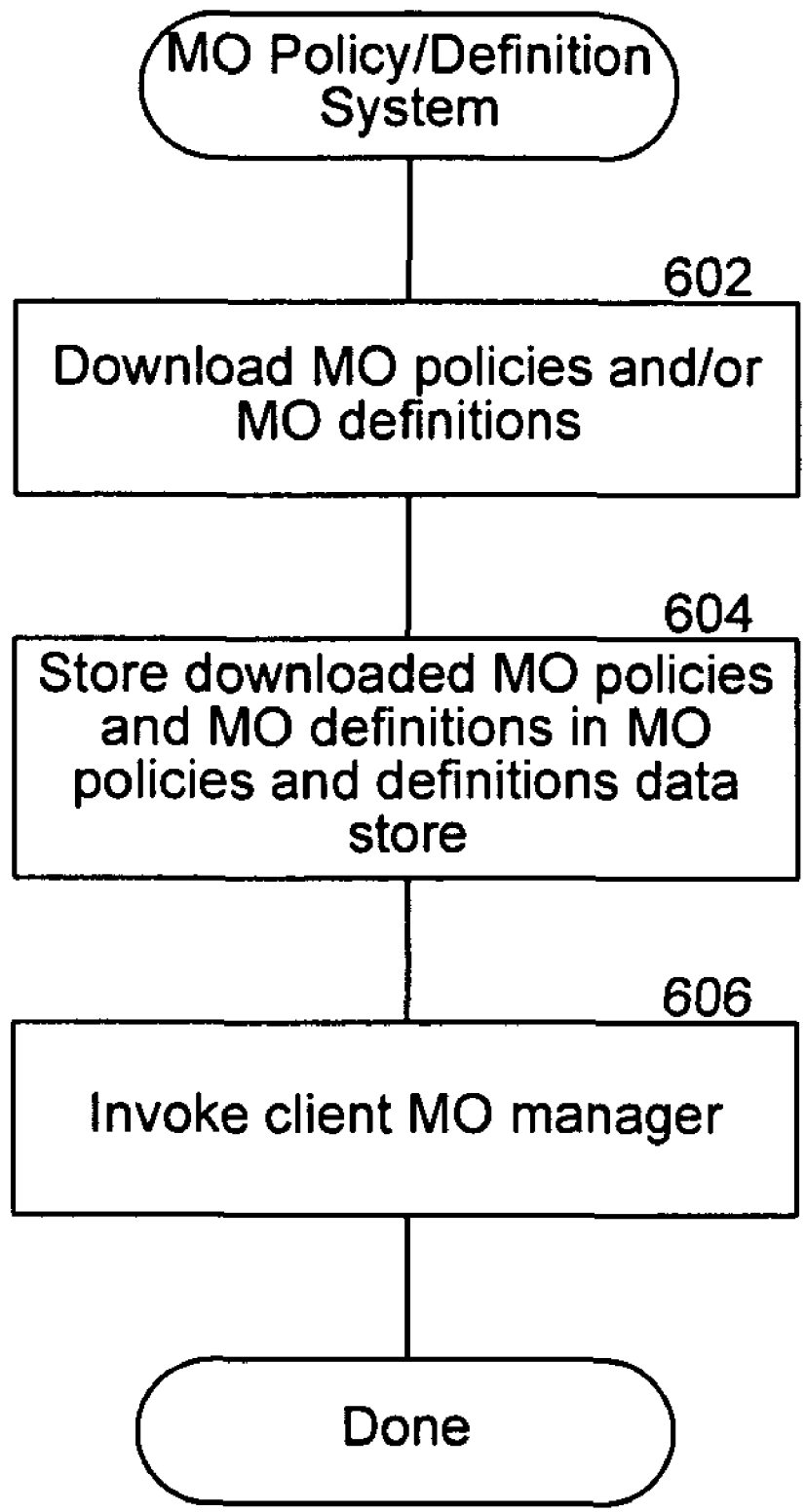
FIG. 6 is a flow diagram that illustrates the processing of a MO policy/definition system of the management system client process, according to some embodiments.

FIG. 6 is a flow diagram that illustrates the processing of a MO policy/definition system of the management system client process, according to some embodiments. In block 602, the MO policy/definition system downloads the MO policies and/or MO definitions from, for example, the management system server. In block 604, the MO policy/definition system stores the downloaded MO policies and MO definitions in the MO policies and definitions data store. In block 606, the MO policy/definition system invokes the client MO manager to process the downloaded MO policies and MO definitions.

Figure 7:
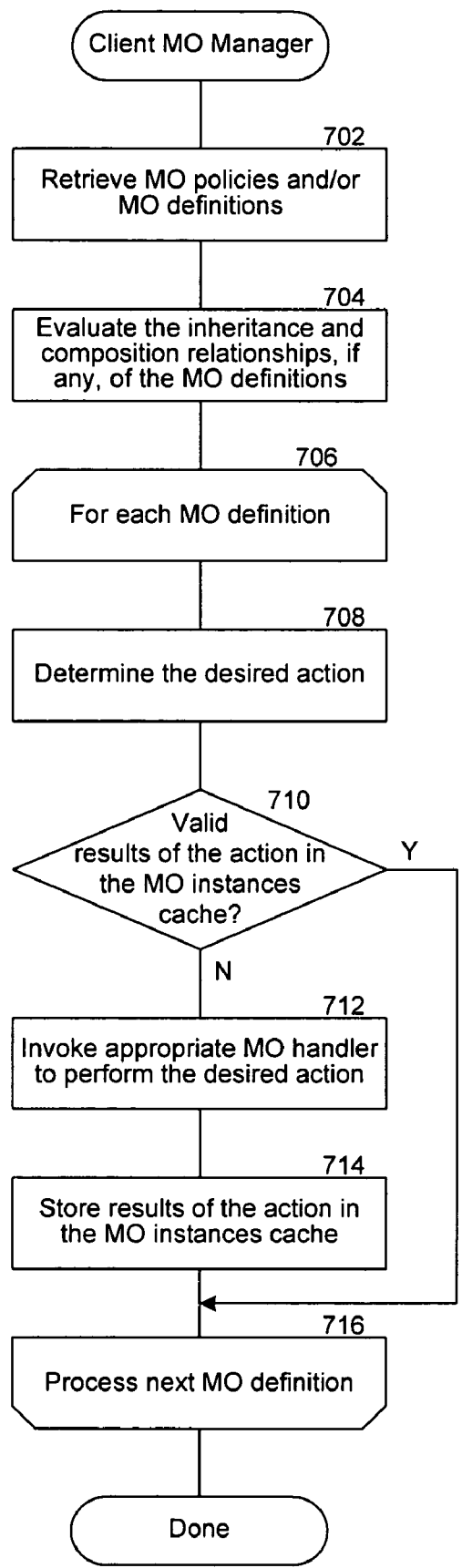
FIG. 7 is a flow diagram that illustrates the processing of a client MO manager of the management system client process, according to some embodiments.

FIG. 7 is a flow diagram that illustrates the processing of a client MO manager of the management system client process, according to some embodiments. In block 702, the client MO manager retrieves the MO policies and/or MO definitions from, for example, the MO policies and definitions data store. In block 704, the client MO manager evaluates the inheritance and composition relationships, if any, of the MO definitions. Then, for each MO definition (block 706), the client MO manager performs blocks 708 to 714, until the MO definitions are processed (block 716). In block 708, the client MO manager determines the desired action for the MO definition. The client MO manager may determine the desired action from an appropriate MO policy. In block 710, the client MO manager checks the MO instances cache to determine if it contains valid results of the action. For example, the client MO manager may have previously performed the same action on the MO definition and cached the results of the action in the MO instances cache. Moreover, the client MO manager may also periodically purge the old or stale results from the MO instances cache, thus invalidating these stale results. For example, the client MO manager may purge from the MO instances cache, or otherwise indicate as being invalid, the old or stale results (e.g., results of actions which were performed more than a predetermined length of time (e.g., 1 min., 5 mins., etc.) ago). If valid results of the action are found in the MO instances cache, then the client MO manager proceeds to process the next MO definition. In this instance, the client MO manager does not need to perform the action for the MO definition because valid results from a previous execution of the action were cached in the MO instances cache.

Otherwise, if, in block 710, the client MO manager determined that valid results of the action are not contained in the MO instances cache, then, in block 712, the client MO manager invokes an appropriate MO handler to perform the desired action. In block 714, the client MO manager receives the results of performing the action from the MO handler and stores the results of the action in the MO instances cache, and proceeds to process the next MO definition.

Figure 8:
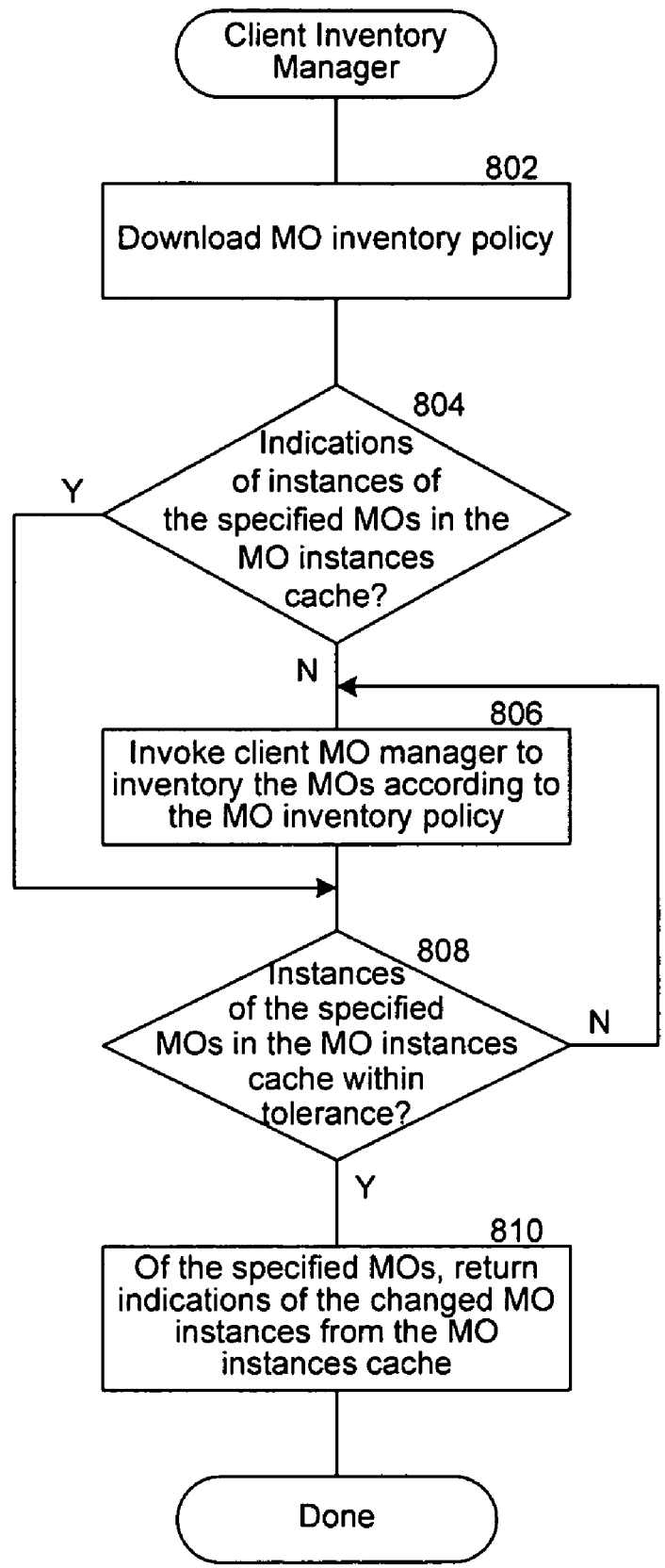
FIG. 8 is a flow diagram that illustrates the processing of a client inventory manager of the management system client process, according to some embodiments.

FIG. 8 is a flow diagram that illustrates the processing of a client inventory manager of the management system client process, according to some embodiments. In block 802, the client inventory manager downloads the MO inventory policy from, for example, the management system server. For example, the MO inventory policy may specify a MO or multiple MOs to inventory (e.g., detect or enumerate) on the managed machine. In block 804, the client inventory manager checks the MO instances cache to determine if it contains indications of instances of the specified MOs. If indications of instances of the specified MOs are not contained in the MO instances cache, then, in block 806, the client inventory manager invokes the client MO manager to inventory the MOs according to the MO inventory policy. Otherwise, if the client inventory manager determined that indications of instances of the specified MOs are contained in the MO instances cache (block 804), or subsequent to invoking the client MO manager (block 806) and allowing the client MO manager to perform an inventory for the specified MOs, the client inventory manager, in block 808, checks to determine if the indications of instances of the specified MOs in the MO instances cache are within tolerance. For example, the specified MOs may need to have been inventoried on the managed machine within a predetermined period of time, such as within the previous 24 hours, etc. If the indications of instances of the specified MOs contained in the MO instances cache are not within tolerance, then the client inventory manager returns to block 806 and invokes the client MO manager to inventory the MOs according to the MO inventory policy. Otherwise, if the indications of instances of the specified MOs contained in the MO instances cache are within tolerance, then, in block 810, of the specified MOs inventoried on the managed machine, the client inventory manager returns indications of the changed MO instances from the MO instances cache. In some embodiments, the client inventory manager returns indications of any of the specified MOs contained in the MO instances cache.

Figure 9:
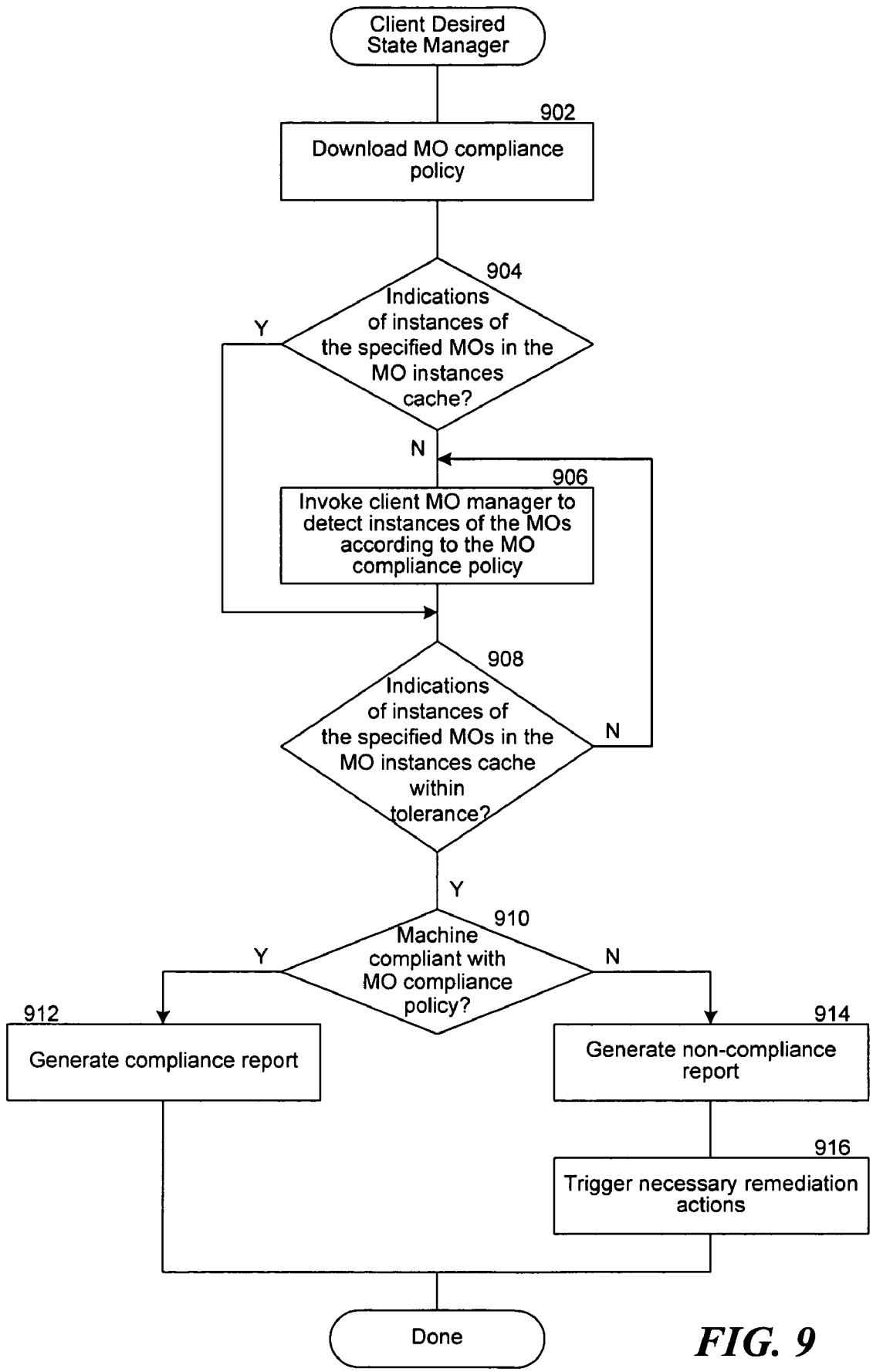
FIG. 9 is a flow diagram that illustrates the processing of a client desired state manager of the management system client process, according to some embodiments.

FIG. 9 is a flow diagram that illustrates the processing of a client desired state manager of the management system client process, according to some embodiments. In block 902, the client desired state manager downloads the MO compliance policy from, for example, the management system server. For example, the MO compliance policy may specify a desired state for the managed machine. In block 904, the client desired state manager checks the MO instances cache to determine if it contains indications of instances of the specified MOs (i.e., the MOs used to specify the desired state in the MO compliance policy). If indications of instances of the specified MOs are not contained in the MO instances cache, then, in block 906, the client desired state manager invokes the client MO manager to detect the MOs according to the MO compliance policy. Otherwise, if the client desired state manager determined that indications of instances of the specified MOs are contained in the MO instances cache (block 904), or subsequent to invoking the client MO manager (block 906) and allowing the client MO manager to perform a detect action for the specified MOs, the client desired state manager, in block 908, checks to determine if the indications of instances of the specified MOs in the MO instances cache are within tolerance. For example, the specified MOs may need to have been detected or not detected on the managed machine within a predetermined period of time, such as within the previous 24 hours, etc. If the indications of instances of the specified MOs contained in the MO instances cache are not within tolerance, then the client desired state manager returns to block 906 and invokes the client MO manager to detect the MOs according to the MO inventory policy.

Otherwise, if the indications of instances of the specified MOs contained in the MO instances cache are within tolerance, then, in block 910, the client desired state manager checks to determine if the managed machine is compliant with the MO compliance policy. If the managed machine is compliant with the MO compliance policy, then, in block 912, the client desired state manager generates a compliance report. Otherwise, if the managed machine is not compliant with the MO compliance policy, then, in block 914, the client desired state manager generates a non-compliance report. In block 916, the client desired state manager may trigger the necessary remediation actions to make the managed machine compliant with the MO compliance policy.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in a computer system having a memory and a processor for managing elements in an information technology environment, the method comprising:

with the computer system, retrieving a first managed object (MO) definition from a plurality of MO definitions, each MO definition representing a managed element on the computer system and being associated with an action, wherein the action associated with the first MO definition is different from the action associated with a second MO definition;

in response to retrieving the first MO definition,
upon determining that results of performing the action associated with the first MO definition are in a cache,
upon determining that the results of performing the action associated with the first MO definition in the cache are stale,
purging from the cache the stale results of performing the action associated with the first MO definition, invoking an appropriate MO handler to perform the action associated with the first MO definition,
storing the results of performing the action associated with the first MO definition in the cache, and
using the results of performing the action associated with the first MO definition, and
upon determining that the results of performing the action associated with the first MO definition in the cache are not stale, using the results from the cache;
upon determining that results of performing the action associated with the first MO definition are not in the cache,
invoking an appropriate MO handler to perform the action associated with the first MO definition, and
storing the results of performing the action associated with the first MO definition in the cache;
periodically upon determining that the results of performing the action associated with the first MO definition in the cache are stale, purging the stale results from the cache;
retrieving the second MO definition; and
in response to retrieving the second MO definition,
upon determining that results of performing the action associated with the second MO definition are in the cache,
upon determining that the results of performing the action associated with the second MO definition in the cache are stale,
purging from the cache the stale results of performing the action associated with the second MO definition,
invoking an appropriate MO handler to perform the action associated with the second MO definition,
storing the results of performing the action associated with the second MO definition in the cache, and
using the results of performing the action associated with the second MO definition, and
upon determining that the results of performing the action associated with the second MO definition in the cache are not stale, using the results from the cache.

2. The method of claim 1, wherein the action associated with the first MO definition is specified in a policy.

3. The method of claim 1, wherein the action associated with the first MO definition is to apply the managed element represented by the first MO definition on the computer system.

4. The method of claim 1, wherein the action associated with the first MO definition is to remove the managed element represented by the first MO definition on the computer system.

5. The method of claim 1, wherein the action associated with the first MO definition is to detect the managed element represented by the first MO definition on the computer system.

6. The method of claim 1, wherein the action associated with the first MO definition is to remediate the managed element represented by the first MO definition on the computer system.

7. The method of claim 1, wherein the first MO definition is a composite MO definition comprised of a plurality of contained MO definitions.

8. The method of claim 7, wherein at least one of the plurality of contained MO definitions is another composite MO definition.

9. The method of claim 1 further comprising evaluating the inheritance and composition relationships, if any, of the first MO definition.

10. An object-based management system server having a memory and a processor comprising:
a user interface component that allows a user to author a managed object (MO) definition for a managed hardware component, assign the MO definition to at least one machine, and specify an action for the MO definition, wherein the MO definition comprises a unique identifier and a-detection logic that detects whether the managed hardware component is present within the at least one machine;
a data store storing the MO definition, the assignment information, and the specified action; and
a server MO manager component that deploys the MO definition to the at least one machine
wherein the user interface component comprises computer-executable instructions stored in memory for execution by the object-based management system server.

11. The system of claim 10, wherein the server MO manager component evaluates MO relationships associated with the MO definition.

12. The system of claim 11, wherein evaluating MO relationships comprises resolving detected conflicts between MOs.

13. The system of claim 10, wherein deploying the MO definition comprises deploying changes to the MO definition since the last time the MO definition was deployed.

14. The system of claim 10, wherein the server MO manager component deploys the specified action for the MO definition to the at least one machine.

15. The system of claim 10, wherein the user interface component presents different pages depending on the type of MO definition being authored.

16. The system of claim 10, wherein the action is a request for an inventory of instances of the MO definition, and further comprising a server inventory manager component that deploys the request for the inventory of instances of the MO definition to the at least one machine, and receives an inventory report of the requested inventory of instances of the MO definition.

17. The system of claim 10, wherein the user interface allows the user to specify a state definition and assign the state definition to the at least one machine, the state definition specifying a desired state of the at least one machine, and further comprising a server desired state manager component that deploys the state definition to the at least one machine, and receives a report of compliance or non-compliance to the state definition.

18. An object-based management system client having a memory and a processor comprising:
a managed object (MO) policy/definition system component that downloads MO definitions from a server, and stores the downloaded MO definitions in a data store, each MO definition corresponding to a managed element;
a client MO manager component that retrieves from the data store a first MO definition, determines a desired action for the first MO definition, determines whether valid results of performing the desired action are in a cache, wherein the cache contains results of performing a first action and a second action different from the first action; and upon determining that valid results of performing the desired action are not in the cache, invokes an appropriate MO handler to perform the desired action, and stores the results of performing the desired action in the cache, wherein the client MO manager component is invoked by the MO policy/definition system component subsequent to storing the downloaded MO definitions in the data store; and a plurality of MO handlers, each MO handler configured to execute one or more actions for one or more MO definitions wherein at least one of the components comprises computer-executable instructions stored in memory for execution by the object-based management system client.

19. The object-based management system client of claim 18 further comprising a client inventory manager component that receives a request for an inventory of instances of one or more of the MO definitions, takes the inventory of instances of one or more of the MO definitions, and responds with the results of the inventory.

20. The object-based management system client of claim 18 further comprising a client desired state manager component that receives a state definition specifying a desired state, checks for the instance of the desired state, and responds with a report of compliance or non-compliance to the specified desired state.

* * * * *